United States Patent [19]

Sakakura et al.

[11] Patent Number: 5,631,331
[45] Date of Patent: May 20, 1997

[54] METHOD FOR THE PREPARATION OF A HEAT-RESISTANT SILICON-CONTAINING POLYMER

[75] Inventors: Toshiyasu Sakakura; Masato Tanaka, both of Tsukuba, Japan

[73] Assignee: Agency of Industrial Science and Technology, Tokyo, Japan

[21] Appl. No.: 551,845

[22] Filed: Nov. 7, 1995

[30] Foreign Application Priority Data

Nov. 17, 1994 [JP] Japan .................... 6-283179

[51] Int. Cl.⁶ .................................. C08G 77/06
[52] U.S. Cl. .................. 525/478; 528/31; 528/40
[58] Field of Search ............ 528/31, 40; 525/478

[56] References Cited

U.S. PATENT DOCUMENTS 4,100,233  7/1978  Yajima et al. ............... 423/345
5,229,481  7/1993  Tilley .............................. 528/10
5,405,655  4/1995  Blum et al. .................... 427/387

OTHER PUBLICATIONS

English Translation of JP 6-256526, Sakasura et al. Sep. 1994.

*Primary Examiner*—Margaret W. Glass
*Attorney, Agent, or Firm*—Wenderoth, Lind & Ponack

[57] ABSTRACT

A highly heat-resistant crosslinked polymer is prepared by subjecting an organic-inorganic hybrid polymer consisting of the repeating monomeric units of the formula $$-(A-SiH_2)-,$$

in which A is a divalent hydrocarbon group such as phenylene group, to an oxidative crosslinking reaction by heating in air at 50° to 400° C.

4 Claims, No Drawings

METHOD FOR THE PREPARATION OF A HEAT-RESISTANT SILICON-CONTAINING POLYMER

BACKGROUND OF THE INVENTION

The present invention relates to a novel method for the preparation of a heat-resistant silicon-containing polymer or, more particularly, to an efficient method for the preparation of a silicon-containing polymer having a structure of organic polymers bonded through siloxane linkages and exhibiting excellent heat resistance to be useful as a constituent of coating compositions, material of structural members for high-temperature service, and so on.

An organic-inorganic hybrid polymer having a structure of organic polymers bonded through siloxane linkages, sometimes called an "ormocer", "ormosil" or "ceramer", has excellent properties including high mechanical strength, high heat resistance, flame retardancy, light-fastness and so on so that polymers of this type are promising and under extensive development works as a constituent of coating compositions, material of structural members for high-temperature service and the like. The properties of these organic-inorganic hybrid polymers are intermediate of organic polymers, i.e. plastic resins, and inorganic materials, i.e. glass and ceramics, so that the application fields thereof are expected to cover those in which satisfactory performance can be exhibited by none of the conventional organic materials and inorganic materials as well as mere combinations thereof as is the subject matter in a large number of reports and reviews.

One of the prior art methods for the preparation of a polymer having a structure of organic polymers bonded through siloxane linkages is the so-called sol-gel method in which the starting materials are an organic polymer having alkoxysilyl groups and an alkoxysilane compound to be subjected to a cohydrolysis-cocondensation reaction. This method, however, has problems and disadvantages and cannot be an industrially practicable method because the process of this method includes a number of steps and it is unavoidable in the steps of condensation reaction and removal of the solvent, alcohol as the hydrolysis product and excess of water that cracks are formed in the body under processing.

SUMMARY OF THE INVENTION

The present invention accordingly has an object, in view of the above described problems and disadvantages in the prior art, to provide a novel and improved method for the industrial preparation of a silicon-containing polymer having a structure of organic polymers bonded through siloxane linkages and exhibiting excellent heat resistance in a simple and convenient process by using an inexpensive starting material of good availability.

Thus, the method of the present invention for the preparation of a silicon-containing polymer having a structure of a polymer crosslinked through siloxane linkages comprises the step of:

exposing a silicon-containing polymer having a structure consisting of the repeating monomeric units represented by the general formula

     (I)

in which A is a divalent hydrocarbon group or, preferably, an arylene group, to an oxidizing atmosphere, preferably, at an elevated temperature of 50° to 400° C. to effect crosslinking between molecules of the polymer.

DETAILED DESCRIPTION OF THE PREFERRED EMBODIMENTS

As is described above, the method of the invention comprises a single step as essential in which a specific starting polymer is exposed to an oxidizing atmosphere so as to cause crosslinking between molecules of the polymer. The starting polymer consists of the moiety of the repeating units represented by the above given general formula (I). This polymer is a known material disclosed, for example, in Japanese Patent Kokai 6-256526 and can be easily prepared by the desilanation reaction of a bis(silyl) compound of the formula $H_3Si$—A—$SiH_3$, in which A has the same meaning as defined above, in the presence of a complex of a transition metal element belonging to the VIIIth Group of the Periodic Table such as ruthenium as a catalyst.

In the above given general formula (I), A is a divalent hydrocarbon group exemplified by alkylene groups having 1 to 20 carbon atoms and arylene groups having 6 to 20 carbon atoms, of which arylene groups are preferred. The alkylene group can be any of straightly linear, branched and cyclic ones including methylene, ethylene, 1,3-propylene, 1,2-propylene, 1,4-butylene, 1,3-butylene, 1,6-hexylene and 1,4-cyclohexylene groups, which optionally can be substituted by halogen atoms, lower alkoxy groups and the like. Examples of the arylene groups include 1,4-phenylene, 1,3-phenylene, 1,5-naphthylene and 2,6-naphthylene groups, of which phenylene groups are preferred. These arylene groups can optionally be substituted by halogen atoms, lower alkyl groups, lower alkoxy groups and the like. Divalent hydrocarbon groups in the form of a metal complex such as 1,1'-ferrocenylene group are also suitable as the divalent group A.

The silicon-containing polymer as the starting material of the inventive method has a molecular structure consisting of a sequence of the monomeric units of the general formula (I) while the sequence can be formed from a single kind of the monomeric units or can be copolymeric consisting of two kinds or more of different monomeric units relative to the divalent groups A. The silicon-containing polymer as the starting material is subjected to a crosslinking treatment in an oxygen-containing atmosphere such as, for example, atmospheric air. Although the crosslinking reaction can proceed even at room temperature if the oxygen partial pressure in the atmosphere is sufficiently high, it is economically advantageous to perform the crosslinking treatment in air by heating the starting polymer at a temperature in the range, for example, from 50° to 400° C. or, preferably, in the range from 100° to 350° C. When the heating temperature is too low, the crosslinking reaction cannot be complete or cannot proceed at an appropriate velocity not to give a highly heat-resistant product as desired while, when the temperature is too high, troubles due to undesirable side reactions may be increased. The length of time taken for completion of the crosslinking reaction may differ widely depending on various factors such as the reaction temperature, partial pressure of oxygen in the ambient atmosphere and others but the reaction is usually complete within 30 minutes to 100 hours or, in most cases, within several hours to several tens of hours.

The organic-inorganic hybrid polymer of the invention obtained in the above described manner has a crosslinked structure and highly resistant against high temperatures of up to 500°C. According to the results of a thermogravimetric analysis, for example, the temperature for a 5% weight loss is 500° C. or higher in air when the rate of temperature elevation is 10° C./minute. In addition, the crosslinked hybrid polymer obtained by the method of the invention is excellent in the mechanical strengths, flame retardancy, light-fastness and so on so that it can be used in various high-duty services such as a vehicle resin in a special coating composition, material for structural members working under very adverse ambient conditions and so on.

In the following, the method of the present invention is described in more detail by way of examples which, however, never limit the scope of the invention in any way.

EXAMPLE 1.

A 10% by weight solution was prepared by dissolving a poly(dihydrosilylene) (1,3-phenylene) in toluene and the solution was cast into a Teflon-made casting mold followed by standing overnight at room temperature so that the solvent was removed by evaporation leaving a resinous film of the starting polymer. A piece of the thus obtained resinous film having a thickness of 0.5 mm was heated in air first at 300° C. for 1 hour and then at 350° C. for 1.5 hours so that the resin film was colored in light yellow. A 6% increase was noted in the weight of the resin film by this heat treatment presumably due to an oxidative crosslinking reaction.

The thus obtained crosslinked resin film was subjected to the thermogravimetric analysis at a rate of temperature elevation of 10° C./minute to find that the temperature corresponding to a 5% weight loss was 516° C. in air and 697° C. in nitrogen.

EXAMPLE 2.

The procedure for the preparation of a crosslinked resin film was substantially the same as in Example 1 except that the heat treatment of the starting resin film was conducted in air at 200° C. for 40 hours. The thus obtained resin film was also colored in light yellow.

The crosslinked resin film was subjected to the thermogravimetric analysis at a rate of temperature elevation of 10° C./minute to find that the temperature corresponding to a 5% weight loss was 700° C. in helium.

The results shown below obtained by the nuclear magnetic resonance spectroscopy and infrared absorption spectroscopy support that the thus obtained resin film has a crosslinked structure expressed by the formula:

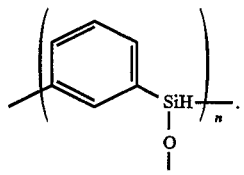

$^{13}$C-NMR (solid), δ: 127.8 ppm; 136.4 ppm $^{29}$Si-NMR (solid), δ: -36.4 ppm; -20.6 ppm IR (KBr): 2138 cm$^{-1}$ (Si—H); 1108 cm$^{-1}$, broad (Si—O)

EXAMPLE 3.

A 10% by weight toluene solution of a poly (dihydrosilylene) (1,3-phenylene) was spread over a polyimide resin film followed by standing overnight at room temperature to evaporate the solvent so that the polyimide resin film was coated with a layer of the poly (dihydrosilylene) (1,3phenylene) having a thickness of 200 μm, which was subjected as such to a heat treatment in air first at 110° C. for 2 hours, then at 150° C. for 2 hours and finally at 200° C. for 40 hours. The thus obtained crosslinked coating layer was clear and colorless without cracks. The adhesive bonding between the coating layer and the substrate film was excellent.

EXAMPLE 4.

The experimental procedure was substantially the same as in Example 2 excepting replacement of the poly (dihydrosilylene) (1,3-phenylene) with a poly (dihydrosilylene) (1,4phenylene). The thus obtained crosslinked resin film was also colored in light yellow. The thermogravimetric analysis of this crosslinked resin film undertaken in the same manner as in Example 2 indicated that the temperature corresponding to a 5% weight loss was 700° C. or higher in helium.

What is claimed is:

1. A method for the preparation of a heat-resistant silicon-containing crosslinked polymer which consists essentially of the step of:

exposing a silicon-containing polymer having a structure consisting of the repeating monomeric units represented by the general formula

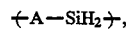

in which A is a divalent hydrocarbon group, to an oxidizing atmosphere at an elevated temperature in the range from 50° to 400° C. to effect crosslinking between molecules of the polymer.

2. The method as claimed in claim 1 in which the divalent hydrocarbon group denoted by A is an arylene group.

3. The method as claimed in claim 2 in which the arylene group is a phenylene group.

4. The method as claimed in claim 1 in which the oxidizing atmosphere is air.

* * * * *